No. 716,326. Patented Dec. 16, 1902.
J. K. WHITE & H. W. DAUB.
TRAP FOR WASTE PIPES.
(Application filed Jan. 7, 1902.)
(No Model.) 2 Sheets—Sheet 1.
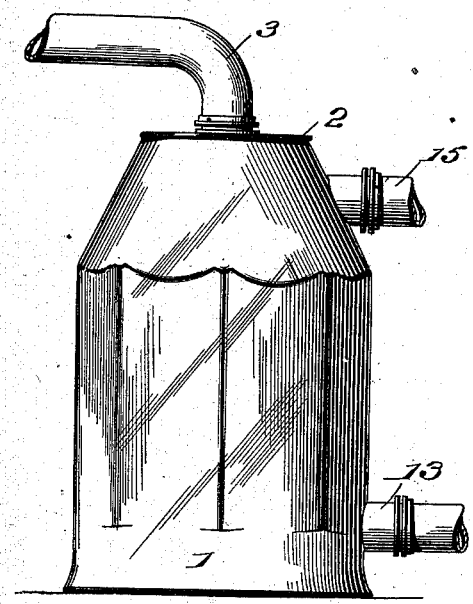
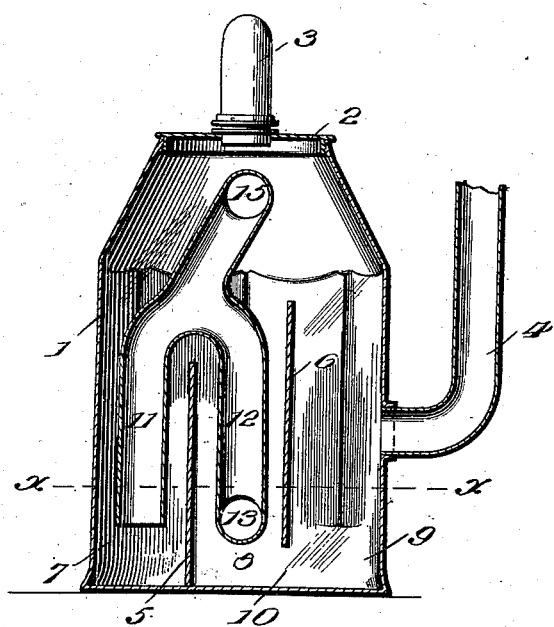
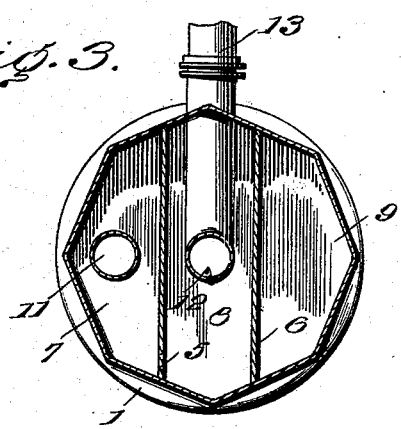
Witnesses
Inventors
J. Kirk White.
Henry W. Daub.
By Alson L. Bailey.
his Attorney No. 716,326. Patented Dec. 16, 1902.
J. K. WHITE & H. W. DAUB.
TRAP FOR WASTE PIPES.
(Application filed Jan. 7, 1902.)
(No Model.) 2 Sheets—Sheet 2.
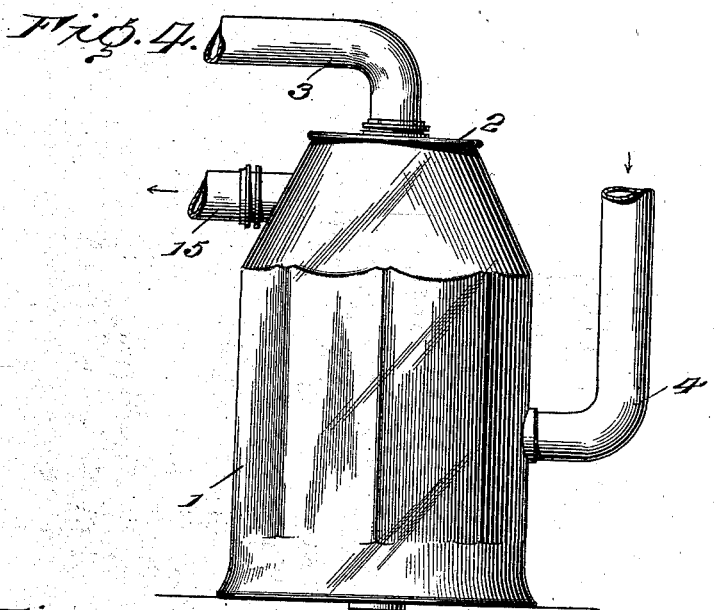
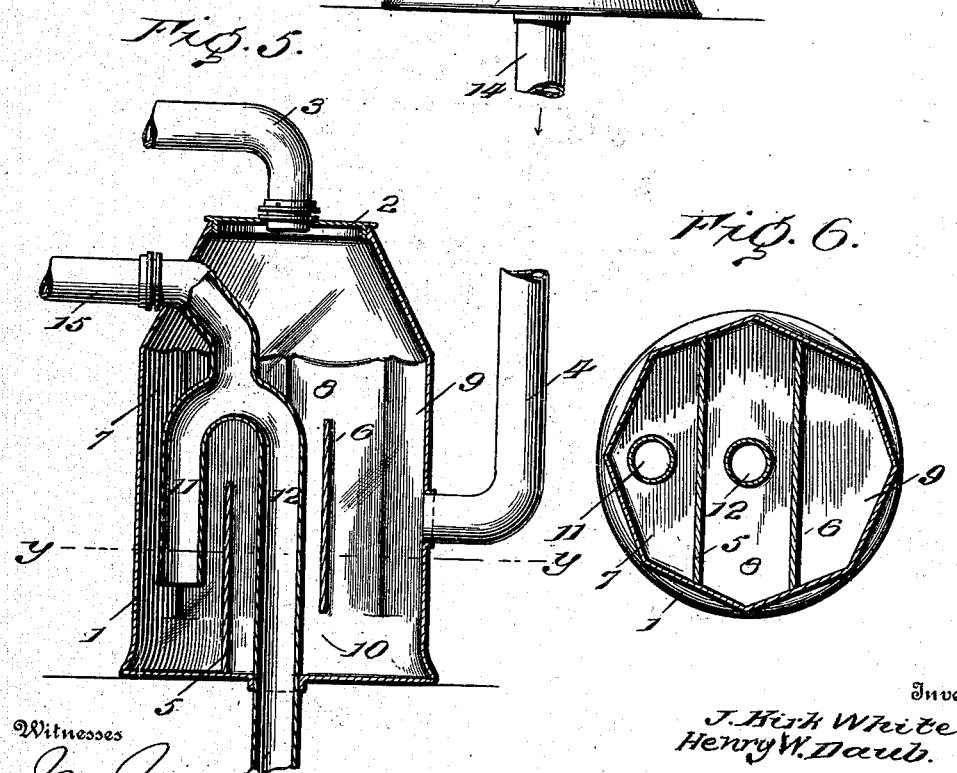
Inventors
J. Kirk White.
Henry W. Daub.
By Alson L. Bailey
his Attorney.
Witnesses

United States Patent Office.

JOEL K. WHITE AND HENRY W. DAUB, OF TOPEKA, KANSAS.

TRAP FOR WASTE-PIPES.

SPECIFICATION forming part of Letters Patent No. 716,326, dated December 16, 1902.

Application filed January 7, 1902. Serial No. 88,714. (No model.)

*To all whom it may concern:*

Be it known that we, JOEL K. WHITE and HENRY W. DAUB, citizens of the United States, residing at Topeka, in the county of Shawnee and State of Kansas, have invented certain new and useful Improvements in Traps for Waste-Pipes; and we do hereby declare the following to be a full, clear, and exact description of the invention, such as will enable others skilled in the art to which it appertains to make and use the same.

Kitchen-sinks and like receptacles into which waste water is thrown for conveyance to a sewer or other discharge connected with the sink or receptacle are trapped to prevent foul odors, sewer-gas, and air-currents from finding entrance into the room or place where the sink or receptacle is located. The traps are frequently choked by grease accumulating therein, and it oftentimes happens that the waste-pipe beyond the trap and the sewer becomes clogged or plugged by grease finding its way therein and accumulating upon the sides.

This invention provides a trap for completely separating the grease from the water and preventing it entering the sewer and the part of the waste-pipe between the trap and sewer, the grease accumulating in the trap and being removable therefrom at intervals.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a side view of a trap embodying the invention. Fig. 2 is a vertical central section thereof. Fig. 3 is a plan section on the line X X of Fig. 2. Fig. 4 is a side elevation of a modification. Fig. 5 is a vertical central section thereof. Fig. 6 is a plan section on the line Y Y of Fig. 5.

Corresponding and like parts are referred to in the following description and indicated in all the views of the drawings by the same reference characters.

The body or case 1 of the trap may be of any size, pattern, or make and constructed of lead, iron, glass, or other material best adapted for the purpose. As shown, the body or case 1 has its upper portion tapering and closed by means of a cap 2, the main portion being octagonal in plan section. The cap 2 is removably fitted to the body or case to admit of grease and other matter being removed from the trap at stated periods or whenever found necessary to avoid choking or a stoppage of the waste water through the trap. A vent-pipe 3 connects with the upper portion of the trap to carry off gas and foul odors. The waste-pipe 4 from the sink, basin, or other receptacle to be trapped connects with the body or case 1 intermediate of its upper and lower ends. Baffle-plates 5 and 6 are disposed in vertical and parallel relation and subdivide the body or case into spaces 7, 8, and 9. The baffle-plate 5 joins the bottom of the case, and its upper end terminates a short distance above the plane of the inlet-pipe 4. The baffle-plate 6 has its lower end spaced from the bottom of the case 1, as shown at 10, and its upper end projects above the upper end of the baffle-plate 5. These baffle-plates 5 and 6 have their vertical edges joined upon opposite sides of the case.

A ∩-shaped pipe has its members or legs set astraddle of the baffle-plate 5 and entering the spaces 7 and 8, the shorter leg 11 terminating at its lower end a short distance above the bottom of the case 1 and the longer leg 12 extending either through a side of the case, as shown at 13, or through the bottom, as shown at 14, according as the discharge-pipe passes through the wall or the floor of the building. A vent-pipe 15 connects with the upper end or yoke of the ∩-shaped pipe, so as to carry off sewer-gas or foul odors which would otherwise enter the trap from the sewer or point of discharge.

A trap constructed in accordance with the invention and connected with a sink, basin, or other receptacle effectually separates all grease from the water and prevents its entrance into the sewer or discharge-pipe. As is well known, grease is of less specific gravity than water and floats upon the surface thereof. Hence when the water from the sink enters the trap through the inlet-pipe 4 an initial separation takes place, the water passing downward beneath the baffle-plate 6 and the grease rising in the space 9. The water entering the space 8 from below rises therein, and any grease contained therein is further separated, the water passing over the baffle-plate 5, thence down into the space 7, and upward into the short leg 11 of the ∩-shaped pipe. The water in its passage through the space 7 has the last trace of grease removed therefrom. The grease and other buoyant matter accumulate in the upper portion of the trap and are removed therefrom at desired periods by unscrewing or lifting the cap 2. In addition to the air-vents 3 and 15 for the prevention of noxious odors and gases entering the building there is formed a water seal, this being due to constructing the ∩-shaped pipe and arranging it within the case 1 so that the lower ends of both members or legs extend below a plane passing horizontally through the lower part of the inlet 4.

Having thus described the invention, what is claimed as new is—

1. In a trap for sinks and the like, a body or case, a vent-pipe connected with the upper end thereof, means for connecting the waste from the sink with the said body at a point intermediate of its upper and lower ends, baffle-plates subdividing the lower portion of the body into approximately vertical spaces, the baffle-plate in proximal relation to the inlet having its lower end spaced from the bottom of the body and the next baffle-plate having its lower end joined to the said bottom and its upper end in a lower plane than the first-mentioned baffle-plate, a ∩-shaped pipe set astraddle of the last baffle-plate and having its shorter leg extended into the last space and terminating a short distance from the bottom of the body and having its longer leg extended through the body to make connection with the sewer, and a vent-pipe extended from the top of the ∩-shaped pipe through the case, substantially as set forth.

2. The herein-described trap for the purposes specified, comprising a body or case, a removable cap closing the upper end thereof, a vent-pipe connected with the said cap, an inlet-pipe connected with the case at a point intermediate of its upper and lower ends, baffle-plates subdividing the lower portion of the body into approximately vertical spaces, the baffle-plate adjacent to the inlet having its lower end spaced from the bottom of the case and the next baffle-plate having its lower end joined to said bottom and its upper end in a lower plane than the first-mentioned baffle-plate, a ∩-shaped pipe set astraddle of the last-mentioned baffle-plate and adapted to have one leg or member extended through the case and connected with the discharge-pipe, and a vent-pipe connected with the upper end of the ∩-shaped pipe extended out from the case, substantially as set forth.

In testimony whereof we affix our signatures in presence of two witnesses.

JOEL K. WHITE. [L. S.]
HENRY W. DAUB. [L. S.]

Witnesses:
OTIS E. HUNGATE,
EDWIN A. AUSTIN.